(12) United States Patent
McGhee et al.

(10) Patent No.: US 8,387,613 B2
(45) Date of Patent: Mar. 5, 2013

(54) METHOD AND APPARATUS FOR A STEAM SYSTEM

(75) Inventors: Owen Roger McGhee, Willoughby, OH (US); Chris Hill, Chagrin Falls, OH (US)

(73) Assignee: Cleveland Range, Inc., Cleveland, OH (US)

( * ) Notice: Subject to any disclaimer, the term of this patent is extended or adjusted under 35 U.S.C. 154(b) by 86 days.

(21) Appl. No.: 12/075,698

(22) Filed: Mar. 13, 2008

(65) Prior Publication Data
US 2008/0223354 A1 Sep. 18, 2008

Related U.S. Application Data

(60) Provisional application No. 60/918,372, filed on Mar. 16, 2007.

(51) Int. Cl.
*A47J 27/00* (2006.01)

(52) U.S. Cl. .............. 126/381.1; 126/382.1; 99/293

(58) Field of Classification Search ............... 126/381.1, 126/382.1; 99/293
See application file for complete search history.

(56) References Cited

U.S. PATENT DOCUMENTS

| | | | | |
|---|---|---|---|---|
| 1,467,141 A * | 9/1923 | Demuth | ............... | 126/377.1 |
| 3,747,513 A * | 7/1973 | Seelbach | ............... | 99/476 |
| 3,887,716 A * | 6/1975 | Seelbach | ............... | 426/231 |
| 4,173,215 A * | 11/1979 | Bureau et al. | ............... | 126/369 |
| 4,187,325 A * | 2/1980 | Tyree, Jr. | ............... | 426/510 |
| 4,250,628 A * | 2/1981 | Smith et al. | ............... | 34/260 |
| 4,281,636 A * | 8/1981 | Vegh et al. | ............... | 126/369 |
| 4,313,798 A * | 2/1982 | Myers, Jr. | ............... | 202/234 |
| 4,506,598 A * | 3/1985 | Meister | ............... | 99/330 |
| 4,906,337 A * | 3/1990 | Palmer | ............... | 202/160 |
| 4,957,520 A * | 9/1990 | Parmentier et al. | ............... | 96/136 |
| 5,117,644 A * | 6/1992 | Fought | ............... | 62/171 |
| 5,304,286 A * | 4/1994 | Palmer | ............... | 202/167 |
| 5,549,038 A * | 8/1996 | Kolvites | ............... | 99/330 |
| 5,605,052 A * | 2/1997 | Middleton et al. | ............... | 62/171 |
| 5,631,033 A * | 5/1997 | Kolvites | ............... | 426/233 |
| 5,832,639 A * | 11/1998 | Muncan | ............... | 38/77.6 |
| 6,772,751 B2 * | 8/2004 | Deuringer et al. | ............... | 126/20 |
| 6,987,246 B2 * | 1/2006 | Hansen et al. | ............... | 219/401 |
| 7,049,551 B2 * | 5/2006 | Williams et al. | ............... | 219/401 |
| 7,282,674 B2 * | 10/2007 | Hansen et al. | ............... | 219/401 |
| 7,317,173 B2 * | 1/2008 | Bartelick et al. | ............... | 219/401 |
| 2003/0145847 A1 * | 8/2003 | Deuringer et al. | ............... | 126/377.1 |
| 2003/0178411 A1 * | 9/2003 | Manganiello et al. | ............... | 219/496 |
| 2004/0261632 A1 * | 12/2004 | Hansen et al. | ............... | 99/468 |
| 2006/0068068 A1 * | 3/2006 | Williams et al. | ............... | 426/509 |
| 2006/0081592 A1 * | 4/2006 | Williams et al. | ............... | 219/401 |
| 2006/0289441 A1 * | 12/2006 | Bartelick | ............... | 219/401 |
| 2007/0194004 A1 * | 8/2007 | Hansen et al. | ............... | 219/401 |
| 2008/0307978 A1 * | 12/2008 | Bassoli | ............... | 99/474 |

FOREIGN PATENT DOCUMENTS

| | | | |
|---|---|---|---|
| DE | 4333585 A1 * | 4/1995 | |
| DE | 10110112 C1 * | 5/2002 | |
| EP | 92851 A * | 11/1983 | |
| GB | 2176695 A * | 1/1987 | |

* cited by examiner

*Primary Examiner* — Kenneth Rinehart
*Assistant Examiner* — Jorge Pereiro
(74) *Attorney, Agent, or Firm* — Ohlandt, Greeley, Ruggiero & Perle, L.L.P.

(57) ABSTRACT

A steam system includes a cooking chamber, a housing comprising a volume of water and an inlet to receive steam, condensate, drain water, and/or weak steam from the cooking chamber, a sensor that detects a temperature of the water, a dispenser that sprays cooling water into the water to reduce the temperature of the water if the temperature exceeds a predetermined level, and an outlet to drain a portion of the water from the housing.

17 Claims, 6 Drawing Sheets

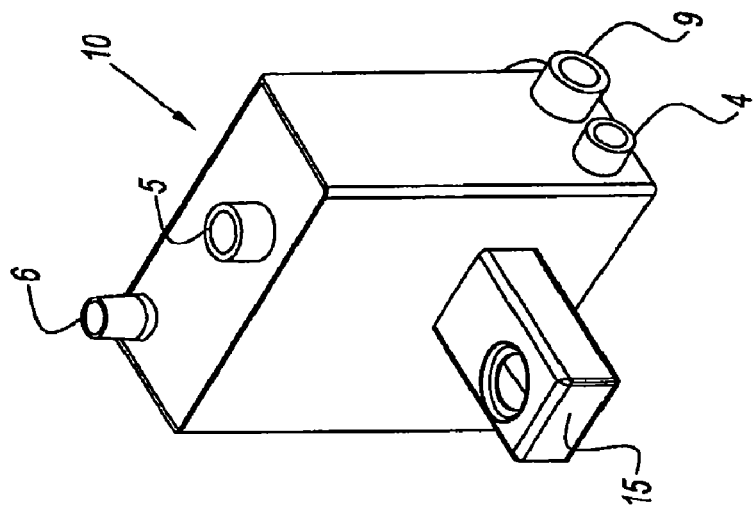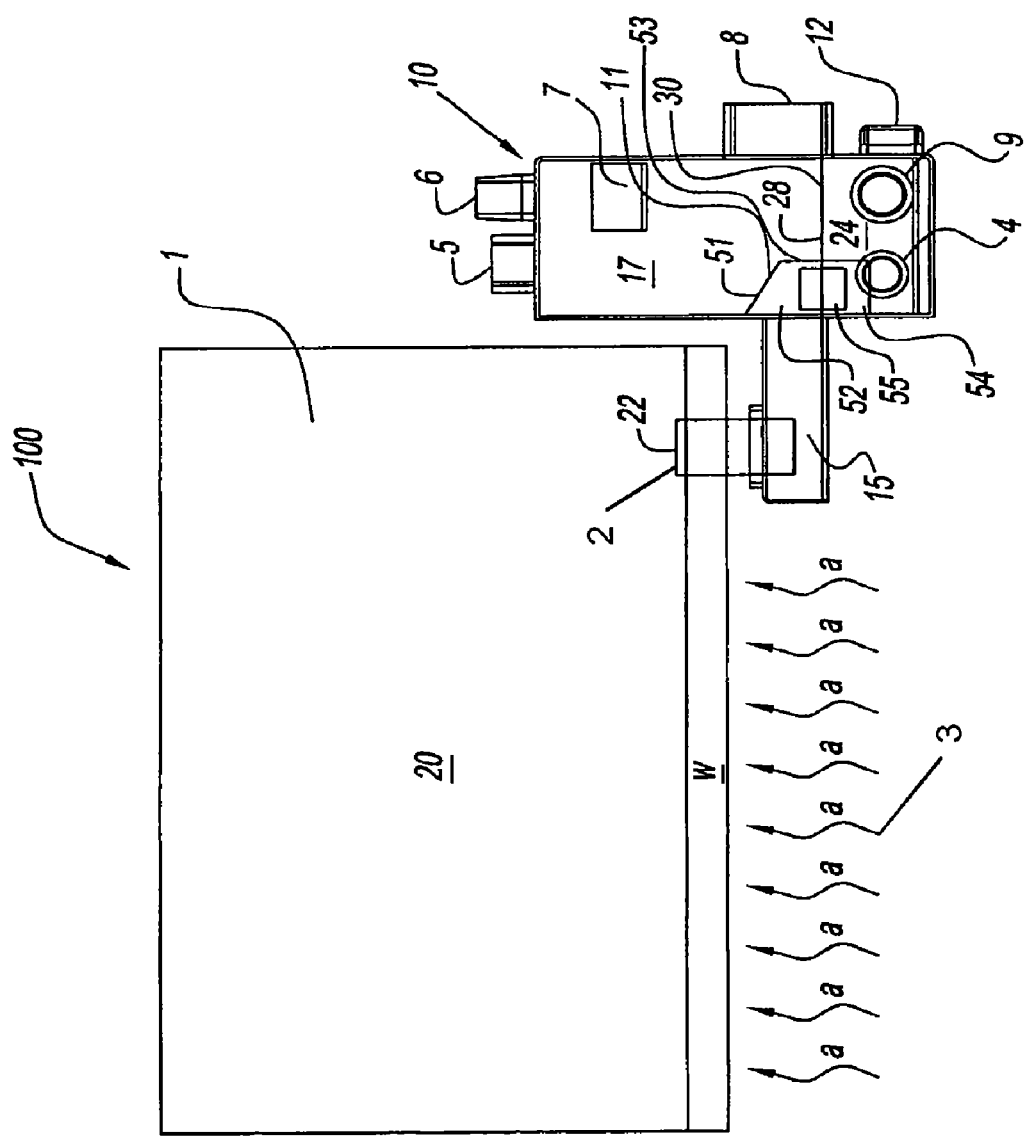

METHOD AND APPARATUS FOR A STEAM SYSTEM

CROSS-REFERENCE TO RELATED APPLICATIONS

This application claims the benefit of Provisional Application Ser. No. 60/918,372, filed Mar. 16, 2007, the contents of which are incorporated by reference herein.

BACKGROUND OF THE INVENTION

1. Field of the Invention

This disclosure relates generally to steam systems and, more particularly, to a method and apparatus for enhancing steam cooker system efficiency.

2. Description of the Related Art

In any non-circulating steam system, it is undesirable for live steam to be discharged into a drain. Elevated temperatures can easily damage modern plumbing. Additionally, it is desirable to retain steam in its work environment as long as feasible to utilize all its energy.

For many years, designers have utilized steam traps to prevent live steam from escaping into drains. However, steam traps become saturated with heat and subsequent high temperature condensate has potential to damage modern plumbing. Designers have also utilized condenser sprays in drains, which have a modest cooling effect on condensate while undesirably employing large quantities of water to collapse the system steam. Condenser sprays can also collapse too much steam, so a net waste of gas or electric energy is experienced along with increased water usage.

Accordingly, there is a need to provide a method and apparatus for enhancing steam cooker system efficiency that maximizes steam energy, reduces use of water, and generates temperatures reducing and/or eliminating damage to modern plumbing.

SUMMARY OF THE INVENTION

A steam system is provided that includes a cooking chamber, a housing comprising a volume of water and an inlet to receive steam, condensate, drain water, and/or weak steam from the cooking chamber, a sensor that detects a temperature of the water, a dispenser that sprays cooling water into the water to reduce the temperature of the water if the temperature exceeds a predetermined level, and an outlet to drain a portion of the water from the housing.

A steam system is also provided that includes a cooking chamber and a steam generator that generates steam in the cooking chamber, where the steam system has an efficiency of at least 50 percent for electric powered units, at least 38 percent for gas fired units and at least 20 percent for all other, commonly used energy sources (i.e. direct steam, fuel oil, etc).

A steam system is further provided that includes a cooking chamber, a steam generator that generates steam for the cooking chamber, and a condenser assembly that decreases water usage between about 50 percent to about 95 percent.

A method of draining steam, condensate, drain water, and/or weak steam from a steam cooking chamber through a condenser assembly having a volume of water is also provided that includes receiving the steam, condensate, drain water, and/or weak steam from the steam cooking chamber into the condenser assembly, detecting a water temperature of the water in a housing of the condenser assembly, activating a dispenser to spray cooling water into the water when the temperature of the water exceeds a first predetermined temperature, and deactivating the dispenser when the temperature falls below a second predetermined temperature.

The steam system may further comprise a diverter that spreads the cooling water over the water. The steam system may further comprise a baffle connected to the inlet of the housing that directs the steam, condensate, drain water, and/or weak steam into the water. The steam system may further comprise a vent disposed between the baffle and the housing that relieves pressure when a predetermined pressure level between the baffle and the housing is exceeded. The steam system may further comprise a vent in the housing that relieves pressure when a predetermined pressure level in the housing is exceeded. The steam system may further comprise a port in the housing. The water may be flushed through the vent and exit the steam system through the port, thereby removing particles out of the housing. The steam system may further comprise a steam generator connected to the housing by a steam inlet in the housing, where water from the steam generator is drained through the steam inlet, whereby the temperature of the water is reduced by the cooling water before exiting the outlet. The steam system may further comprise a conduit connected to the inlet that is connectable to the steam cooking chamber.

The steam system may have a drain connected to a condenser assembly that comprises a housing comprising a water compartment for holding a volume of water and an inlet to receive steam, condensate, drain water, and/or weak steam, a sensor that detects a temperature of the water, a dispenser that sprays cooling water into the water to reduce the temperature of the water based if the temperature exceeds a predetermined level, and an outlet to drain a portion of the water from the housing.

The steam system may use less than 1.3 gallons of water per hour. The condenser assembly may comprise a housing comprising a water compartment for holding a volume of water and an inlet to receive steam, condensate, drain water, and/or weak steam, a sensor that detects a temperature of the water, a dispenser that sprays cooling water into the water to reduce the temperature of the water based if the temperature exceeds a predetermined level, and an outlet to drain a portion of the water from the housing.

The method may further comprise draining a portion of the water out of the housing when a water level of the water is greater than a predetermined water level. The housing may have a baffle connected to an inlet in the housing that receives the steam, condensate, drain water and/or weak steam into the housing, and where the baffle directs the steam, condensate, drain water, and/or weak steam into the water. The method may further comprise venting an area between the baffle and the housing to relieve pressure when a predetermined pressure level between the baffle and the housing is exceeded. The condenser assembly may be connected to a steam generator, and further comprise draining a portion of water that generates steam from the steam generator through the condenser assembly. The method may further comprise reducing a frequency that an energy source of the steam generator to create steam is activated by the activating of the dispenser. The method may further comprise venting the housing to relieve pressure when a predetermined pressure level in the housing is exceeded.

The above-described and other features and advantages of the present disclosure will be appreciated and understood by those skilled in the art from the following detailed description, drawings, and appended claims.

BRIEF DESCRIPTION OF THE DRAWINGS

FIG. 1 is a schematic of a front cross-sectional view of a steam cooker system having a condenser assembly of the present disclosure.

FIG. 2 is a schematic of a front perspective view of the condenser assembly of FIG. 1.

DETAILED DESCRIPTION OF THE INVENTION

Figure 3:
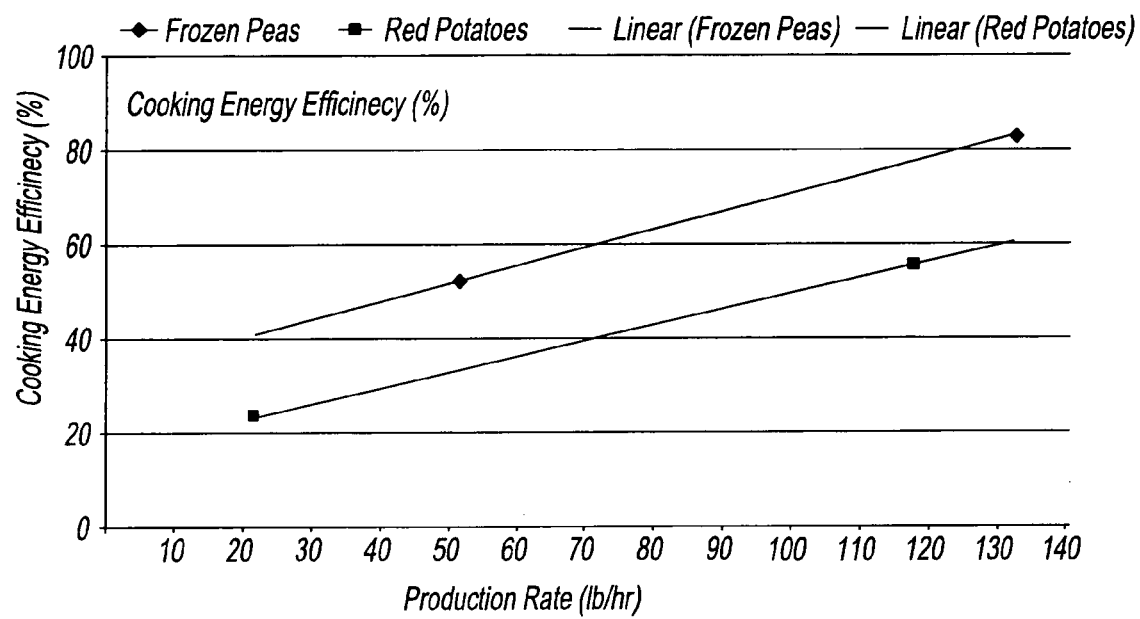
FIG. 3 is a graph plotting percent cooking energy efficiency versus production rate.

Referring now to the figures and in particular to FIG. 1, a first exemplary embodiment of a steam cooker system including a condenser assembly 10 according to the present disclosure is generally represented by reference numeral 100. For purposes of clarity only, system 100 and condenser assembly 10 are described herein for use as a cooker.

System 100 has a steam cooking chamber 1. Steam cooking chamber 1 has steam communicated into an interior volume 20. Steam cooking chamber 1 may be connected to an energy source 3. Energy source 3 generates steam directed into interior volume 20 of steam cooking chamber 1, as shown by arrows 'a'. The steam may be generated by energy source 3 heating water W contained in a bottom portion of steam cooking chamber 1 or a separate steam generator. Energy source 3 may be any energy source, such as, for example, electricity, gas, oil, steam, or any combination thereof.

System 100 has a condensate drain 2. Condensate drain 2 drains condensate and weak steam from cooking chamber 1. Weak steam is steam at a low energy state before the steam converts to liquid. Steam is attracted to the coolest surface in an area. Steam in cooking chamber 1 may be drawn to foodstuffs in cooking chamber 20. Steam usage is related to surface areas and temperatures of one or more foodstuffs in cooking chamber 1. Condensate or condensate steam includes surplus steam, condensate and/or weak steam that may not be absorbed by the foodstuffs and may be entrained down condensate drain 2. Condensate drain 2 may be a relatively cool surface in cooking chamber 1 to attract steam in cooking chamber 1. Condensate drain 2 may have a condensate drain opening 22 above a water line of heating water W.

Condensate drain 2 is connected to a condenser assembly 10. Condenser assembly 10 has a housing enclosing an interior volume 17. Condensate drain 2 may be connected to condenser assembly 10 by a conduit 15. Conduit 15 may be any shape. Conduit 15 may be a shape that is easily manufactured.

The condensate and steam in condensate drain 2 is forced into condenser assembly 10 through an inlet in condenser assembly 10 having a baffle 11. Baffle can be a conduit of any shape having walls 51, 52, 53 and 54. Baffle 11 discharges condensate steam from said conduit 15 into a water bath 24 in interior volume 17. As discussed above, steam is attracted to the coolest surface in an area, and condensate may be drawn through conduit 15 and baffle 11 due to the temperature of water bath 24. The temperature of water bath 24 may be cooler than cooking chamber 1 attracting condensate to water bath 24.

Water bath 24 condenses the condensate steam into a liquid form. As the condensate and steam goes through a phase change, energy is released into water bath 24 and may increase the water temperature thereof. Water bath 24 increases in temperature as more condensate steam is discharged therein.

A vent 55 may be positioned between baffle 11 and the portion of the condenser assembly having conduit 15. Vent 55 vents the area between baffle 11 and the portion of the condenser assembly having conduit 15. Vent 55 ensures relief of pressure above a predetermined amount of pressure, for example, if baffle 11 is blocked. The predetermined amount of pressure, for example, is 1 atmosphere.

Water bath 24 has a water bath temperature that is monitored via a sensor 4. Sensor 4 may be electronic, bimetallic or electromechanical; however, any sensor known in the art that measures water temperature may be used. The temperature sensor 4 may be removable for maintenance and/or replacement. When the water bath temperature as detected by sensor 4, exceeds a predetermined high or upper temperature (e.g. about 110 degrees Fahrenheit to about 150 degrees Fahrenheit), a cooling spray 6 is activated. Cooling spray 6 may continue to run until the water bath temperature is below a predetermined low temperature (e.g. about 90 degrees Fahrenheit to about 140 degrees Fahrenheit) detected by sensor 4. Cooling spray 6 is a dispenser that dispenses or sprays cooling water.

Water flow from cooling spray 6 may be directed at a cooling spray diverter 7. Cooling spray diverter 7 disperses cooler water relative to water bath 24 over a surface 28 of water bath 24 to maintain the temperature of water bath 24, for example, below 140° F. The cooling spray 6 may have a head that can be removed for cleaning and/or maintenance.

Cooling spray 6 maintains drain temperatures, such as, the water bath temperature, below a predetermined temperature (e.g., about 110 to about 150, preferably 140° F.) of system 100 to protect plumbing, such as, modern, non-metallic plumbing.

Temperature sensor 4 activates and deactivates cooling spray 6 to maintain water bath 24 in a pre-defined range during a predetermined time period, such as, an entire cooking cycle. Cooling spray 6 may be on a top wall of condenser assembly 10, as shown in FIG. 1. It has been determined by the present disclosure that cooling spray 6 distributing water against cooling spray diverter 7 distributes water from cooling spray 6 without mineral buildup that may occur in a cooling sprayer having a nozzle to distribute water. However, cooling spray may include a nozzle to distribute water. Cooling spray diverter 7 may be any shape, or be one of the interior walls of the condenser assembly.

Condenser assembly 10 may drain water as a water level 30 of water bath 24 rises over a predetermined waterbed level. Water may be drained out of condenser assembly 10 through main drain 8. As water is added to water bath 24, water level 30 increases and surplus water overflows into main drain 8, as water level 30 reaches the position of main drain 8.

Condenser assembly 10 is vented to prevent pressure from exceeding a predetermined interior pressure. Condenser assembly 10 may include an atmospheric vent 5 to prevent pressure from building inside cooking chamber 1 or condenser assembly 10. Atmospheric vent prevents a vacuum from forming, for example, when a door to cooking chamber 1 is opened and prevents pressure from building inside the cooking cavity.

Cooking chamber 1 or other outside source of steam may be drained into condenser assembly 10 through a generator drain inlet 9. For example, a hose or conduit may connect water W from system 100 to condenser assembly 10, so that water W mixes with water bath 24 prior to draining. Water W may also be drained from a separate steam generator into condenser assembly 10. Temperature sensor 4 activates and deactivates cooling spray 6 when drain water exiting generator drain inlet 9 is above a predetermined drain temperature. Activating and deactivating cooling spray 6 cools the drain water. As water level 30 rises while draining system 100, water drains out of main drain 8.

By maintaining water bath 24 at a higher temperature than an incoming water temperature of cooling spray 6, and below a maximum threshold temperature that damages non-metallic plumbing, energy from the steam is maximized and concentrated on cooking foodstuffs. Energy efficiency is increased as an energy source 3 is actuated less often.

The condenser assembly may include a flush and cleaning access port 12. The flush and cleaning access port 12 may be opened by removing a cover thereon providing access to the interior of condenser assembly 10 for cleaning and/or maintenance, for example, to make adjustments or fixes to condenser assembly. For example, particles such as food may become lodged in the condenser assembly 10. The flush and cleaning access port 12 may be removed and cooling spray 6 may be activated to flush out the particles through flush and cleaning access port 12 out of condenser assembly 10. Fluid such as water may be directed through atmospheric vent 5, the interior of condenser assembly 10 that holds water bath 24, and out through flush and cleaning access port 12. Flush and cleaning access port 12 may be any size or shape, for example, flush and cleaning access port 12 may be sized similar to a garden hose.

The condenser assembly 10 may be formed from any material. Materials that are resistant to high temperatures and corrosion may extend the lifetime of condenser assembly 10 and, hence are preferred. Condenser assembly 10 may be used with various steamers. Condenser assembly 10 may be used with various steamers by modifying the dimensions, and thus volume, thereof. For example, a ratio of steam cooking chamber 1 to a volume of condenser assembly 10 may be in a range between about 150 to 1 and about 600 to 1. The condenser is sized to maximize the efficiency of a steamer and minimize the use of water by the steamer connected thereto. The condenser assembly decreases water usage between about 50 percent to about 95 percent.

Figure 8:
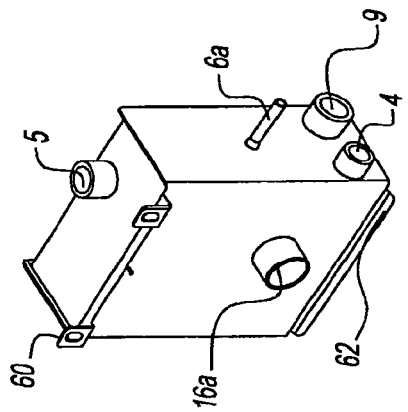
FIG. 8 is a front perspective view of the condenser assembly of FIG. 7.
Figure 9:
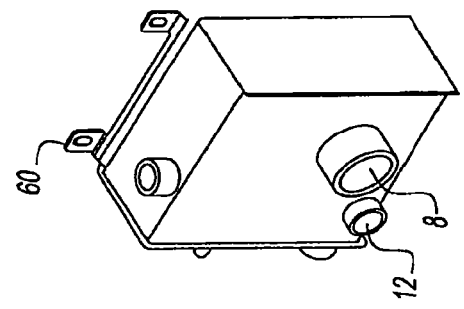
FIG. 9 is a rear perspective view of the condenser assembly of FIG. 7.
Figure 7:
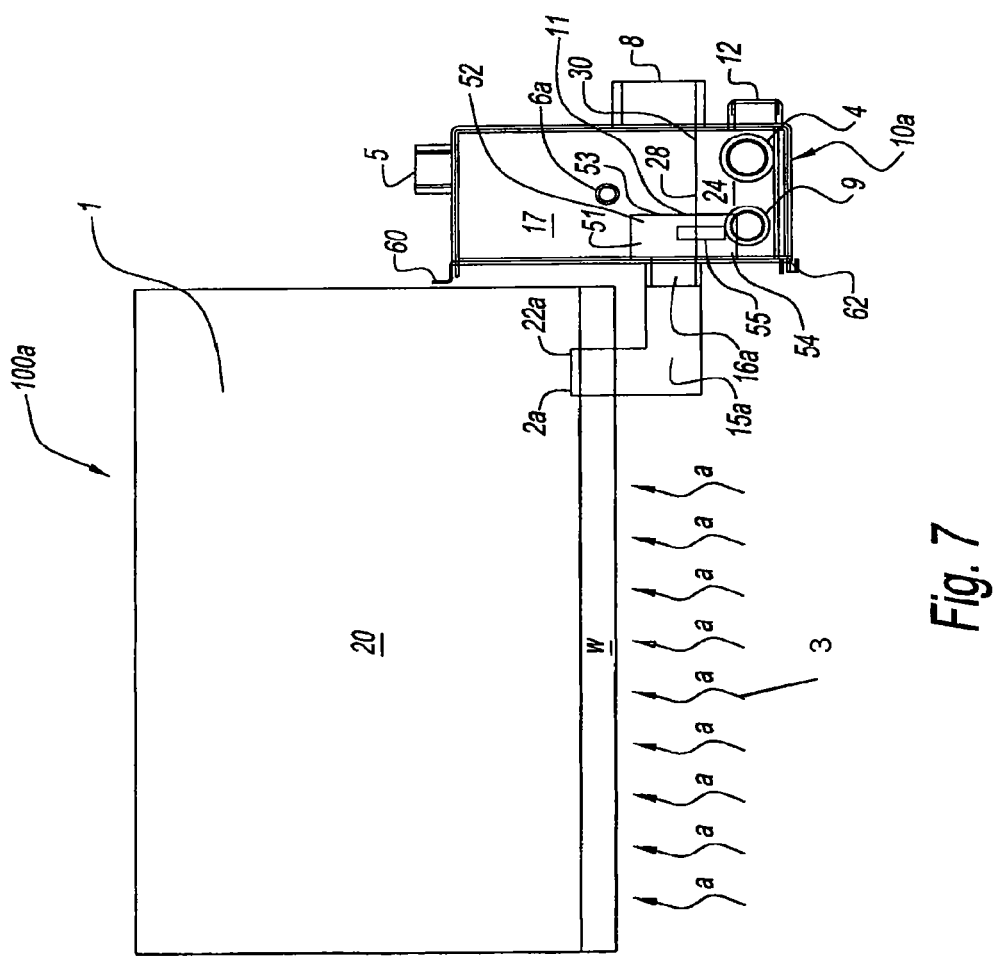
FIG. 7 is a schematic of a front cross-sectional view of another embodiment of a steam cooker system of the present disclosure having a condenser assembly.

FIGS. 7 through 9 show system 100a having another exemplary embodiment of a condenser assembly referred to by reference numeral 10a. The features of system 100a that are the same as system 100 described above have the same reference numerals. For purposes of clarity only, system 100a and condenser assembly 10a are described herein for use as a cooker.

System 100a has a steam cooking chamber 1. Steam cooking chamber 1 has steam communicated into an interior volume 20. Steam cooking chamber 1 may be connected to an energy source 3. Energy source 3 generates steam directed into interior volume 20 of steam cooking chamber 1, as shown by arrows 'a'. The steam may be generated by energy source 3 heating water W contained in a bottom portion of steam cooking chamber 1 or a separate steam generator. Energy source 3 may be any energy source, such as, for example, electricity, gas, oil, steam, or any combination thereof.

System 100a has a condensate drain 2a. Condensate drain 2a drains condensate and weak steam from cooking chamber 1. Steam in cooking chamber 1 may be drawn to foodstuffs in cooking chamber 20. Condensate drain 2 may be a relatively cool surface in cooking chamber 1 to attract steam in cooking chamber 1. Condensate drain 2a may have a condensate drain opening 22a above a water line of heating water W.

As discussed above, condensate drain 2a is connected to a condenser assembly 10a. Condensate drain 2a may be part of a conduit 15a and conduit 15a may be connected to condenser assembly 10a. Conduit 15a may include condensate drain 2a and condensate drain opening 22a. As shown in FIGS. 7 and 8, condenser assembly 10a may have an inlet 16a. Conduit 15a connects to condenser assembly 10a over inlet 16a for passage of fluid into condenser assembly 10a. Conduit 15a may be any shape. Conduit 15a may be a shape that is easily manufactured.

The condensate and steam in condensate drain 2a is forced through conduit 15a, inlet 16a, and a baffle 11 to discharge condensate steam into a water bath 24. Water bath 24 condenses the condensate steam into a liquid form. As the condensate and steam goes through a phase change, energy is released into water bath 24 and may increase the water temperature thereof. Water bath 24 increases in temperature as more condensate steam is discharged therein. Vent 55 may be positioned between baffle 11 and the portion of the condenser assembly connecting to conduit 15a. Vent 55 vents the area between baffle 11 and the portion of the condenser assembly connected to conduit 15a. Vent 55 ensures relief of pressure if baffle 11 is blocked.

Water bath 24 has a water bath temperature that is monitored via a sensor 4. Sensor 4 may be electronic, bimetallic or electromechanical; however, any sensor known in the art that measures water temperature may be used. The temperature sensor 4 may be removable for maintenance and/or replacement. When the water bath temperature as detected by sensor 4, exceeds a predetermined high or upper temperature (e.g. about 110 degrees Fahrenheit to about 150 degrees Fahrenheit), a cooling spray 6a is activated. Cooling spray 6a may continue to run until the water bath temperature is below a predetermined low temperature (e.g. about 90 degrees Fahrenheit to about 140 degrees Fahrenheit) detected by sensor 4. Cooling spray 6a is on a sidewall of condenser assembly 10a, as shown in FIG. 7.

Water flow from cooling spray 6a is directed at an interior wall of the condenser assembly, using the wall as a spray diverter, cooling water bath 24; however, a cooling spray diverter separate from the wall may be used. The cooling spray 6a may have a head that can be removed for cleaning and/or maintenance. Cooling spray 6a may have a portion extending outside of condenser assembly 10a that may be connectable to an on/off valve and/or tubing that provides cooling water to cooling spray 6a.

Cooling spray 6a reduces and/or eliminates steam from prematurely condensing over the prior art and maintains drain temperatures, such as, the water bath temperature, below a predetermined temperature (e.g. about 110 degrees Fahrenheit to about 150 degrees Fahrenheit, preferably 140° F.) of system 100 to protect plumbing, such as, modern, non-metallic plumbing. Temperature sensor 4 activates and deactivates cooling spray 6a to maintain water bath 24 in a predefined range during a predetermined time period, such as, an entire cooking cycle.

Condenser assembly 10a may drain water as a water level 30 of water bath 24 rises over a predetermined waterbed level. Water may be drained out of condenser assembly 10a through main drain 8. As water is added to water bath 24, water level 30 increases and surplus water overflows into main drain 8.

Condenser assembly 10a is vented to prevent pressure from exceeding a predetermined interior pressure. Condenser assembly 10a may include an atmospheric vent 5 to prevent pressure from building inside cooking chamber 1 or condenser assembly 10. Atmospheric vent prevents a vacuum from forming, for example, when a door to cooking chamber 1 is opened and prevents pressure from building inside the cooking cavity.

Cooking chamber 1 or other outside source may be drained into condenser assembly 10a through a generator drain inlet 9. For example, a hose or conduit may connect water W from system 100a to condenser assembly 10a, so that water W mixes with water bath 24. Water may also be drained from separate steam generator through condenser assembly 10a. Temperature sensor 4 activates and deactivates cooling spray 6a when drain water exiting generator drain inlet 9 is above a predetermined drain temperature. Activating and deactivating cooling spray 6a cools the drain water. As water level 30 rises while draining system 100a, water drains out of main drain 8.

By maintaining water bath 24 at a higher temperature than an incoming water temperature of cooling spray 6a, and below a maximum threshold temperature, e.g. about 110 degrees Fahrenheit to about 150 degrees Fahrenheit, that damages non-metallic plumbing, energy from the steam is maximized and concentrated on cooking foodstuffs. Energy efficiency is increased as an energy source 3 is actuated less often.

Condenser assembly 10a may include securing (or mounting) structures such as, for example, a top securing structure 60 and a bottom securing structure 62. Top securing structure 60 and bottom securing structure 62 may be connected to a surface to support condenser assembly 10a. Securing and mounting structures may separate the condenser assembly from the cooking compartment or steam generator, isolating it from the heat generated in either of those two areas.

The below test results demonstrate energy efficiency levels of 56% minimum from the condenser assembly combined with a steamer. Further, it has been found that the steam system of the present disclosure may have an efficiency of at least 50 percent for electric powered units, at least 38 percent for gas fired units and at least 20 percent for all other energy sources. Prior units without condenser assemblies described in this patent were only 6.0% efficient. Water usage dropped from 30 gal/hr to 1.55 gal/hr. Steamers including the condenser assembly decreases water usage by about 50 percent to about 95 percent.

EXAMPLE

An atmospheric steamer according to the present disclosure is a high speed (fan driven) convection, 6-pan capacity, single compartment, electric, steamer. The steam cooker is powered by a 13.5 kW heating element located beneath the cooking compartment's water reservoir. Steam is generated within the cooking compartment without a separate boiler. The water level in the 1.5-gallon open-style water reservoir is maintained by automatic water level controls, eliminating the need to monitor and manually refill the reservoir during operation.

TABLE 1

Appliance Specifications

| | |
|---|---|
| Generic Appliance Type | One-Compartment Electric Steamer |
| Rated Input | 13.5 kW |
| Technology | Atmospheric Steamer |
| Construction | Stainless Steel |
| Interior | Back 14 ga, Top 14 ga, Bottom 10 ga |
| Exterior | 20 ga |
| Controls | 60 minute electro-mechanical timer |
| | Timed/Manual selector |
| | ON/OFF lever |
| | LED indicator lights for Power ON, and Reset. |
| Compartment Capacity | 6 (20" × 12" × 2½") Pans |
| Dimensions | (21.63" × 31.19" × 30.75") (w × d × h) |

The steam cooker was installed in accordance with the manufacturer's instructions and in accordance with Section 9 of the ASTM test method[1] under a 4-foot-deep canopy hood, with the lower edge of the hood 6 feet, 6 inches above the floor and a minimum of 6 inches (8 inches actual measurement) inside the vertical front edge of the hood. The exhaust ventilation nominal rate was 150 cfm per linear foot (Assumed. The hood was installed in accordance with the manufacturer's instructions and per code.) of hood. The ambient temperature was maintained at 75±5° F.

[1] American Society for Testing Materials, 2005. *Standard Test Method for the Performance of Steam Cookers*. ASTM Designation F1484-05, in the Annual Book of ASTM Standards, West Conshohocken, Pa.

Power and energy were measured with a watt/watt-hour transducer that generated an analog signal for instantaneous power and a pulse for every 10 Wh. The thermocouples were connected to a computerized data acquisition unit that recorded data every 5 seconds.

The energy input rate was determined by measuring the energy consumed by the steamer during a complete preheat cycle. The maximum power draw during this period was reported as the Measured Energy Input Rate. Preheat tests recorded the time and energy required for the steamer to reach operating temperature from a cold start when turned on for the first time in a day. An hour after the preheat cycle was completed, the steamer was placed in the "hold" mode and Idle Energy Consumption was monitored over a 2-hour period.

Frozen Green Pea Efficiency Tests

Individually flash-frozen, grade A green peas represented one of two food products for steamer performance testing. Standard full-size (12"×20"×2½'), perforated stainless-steel hotel pans were used for cooking the green peas. The steam cooker required 6 pans of green peas for a full load, while a single pan placed on the center rack of the steamer cavity comprised a light load. Each pan contained 8.0±0.011 b of green peas. Preweighed green peas in perforated pans were stored in sealed plastic bags at 0±5° F. for at least 24 hours prior to testing. The pans of peas were transferred into an insulated box and transported to the testing location where the plastic bags were removed, and the pans of green peas were loaded into the steamer according to the loading time prescribed in section 10.7.6 of the ASTM test method.

Since probing proves to be difficult and erroneous for measuring the temperature of small-sized green peas, a water-bath calorimeter was utilized to determine the final bulk temperature of the cooked green peas. The time required to cook the frozen peas to a bulk temperature of 180±5° F. was determined through an iterative process. Once the cook time was established, the test was replicated a minimum of three times to minimize the uncertainty in the test results.

Red Potato Efficiency Tests

Fresh whole US No. 1 size B red potatoes served as the second food product for steamer performance testing. The full load required 6 pans of red potatoes and a single pan for a light load. Each pan contained 50±2 red potatoes weighing 8.0±0.2 pounds.

The red potatoes were loaded into perforated pans prior to the test and stabilized to a room temperature of 75±5° F. The potatoes were then cooked to 195±2° F. The final temperature was determined by probing a minimum of 3 potatoes per pan (using a hand-held, digital thermocouple meter) within 3 minutes after cooking was terminated. Again, the test was replicated a minimum of three times to minimize the uncertainty in the test results.

Ice-Load Cooking Uniformity Test

The ice load test required 6 full-size solid (12×20×2½) pans of ice. Each pan contained 8.0±0.2 pounds of ice, which had been stabilized in a freezer at 0±5° F. for approximately 12 hours. Each pan was instrumented with a thermocouple positioned at the geometric center of the ice to monitor ice load temperature during the test. When the first pan reached a final temperature of 170° F., the time was noted; the ice loads remained in the steamer and steaming continued until the last pan of ice reached 170° F., when the temperatures and final cook time were recorded. Three replications of this test were performed.

Energy Input Rate

The Cleveland Range rating plate value for energy input was compared to the energy input measured in the lab prior to any testing to ensure the steamer was operating within its specified parameters. The steamer had a maximum energy input rate of 12.97 kW.

Preheat and Idle Tests

Idle Energy Rate

Following the preheat period, the steamer was left in the "hold" mode and allowed to stabilize for one hour. Then the steamer was monitored over a 2 hour period and the idle energy rate was determined to be 0.375 kW.

Rated energy input, preheat energy, and idle rate test results are summarized in Table 2.

TABLE 2

Average Input, Preheat, and Idle Test Results

| | |
|---|---|
| Rated Energy Input Rate (kW) | 13.5 |
| Measured Energy Input Rate (kW) | 12.97 |
| Preheat to Operational Capacity | |
| Time (min) | 6.6 |
| Energy (kWh) | 1.44 |
| Idle Energy Rate (kW) | 0.375 |

Cooking Tests

The steamer was tested using two different food products (green peas and red potatoes) under two loading scenarios—heavy (6 pans) and light (single pan). All cooking scenarios were conducted in the steamer's Timed cooking mode.

Water usage for each scenario varied between 6 gallons per hour and 10 gallons per hour.

Frozen Green Pea Tests

Moisture content of the frozen green peas was 81% by weight, corresponding to specific heats (Cp) of 0.44 Btu/lb° F. for frozen and 0.84 Btu/lb° F. for thawed peas[1]. The steamer required 22 minutes to cook a full load of frozen green peas and had a cooking energy efficiency of 83.14% and a production capacity of 131.89 lb/h.

The light-load test required an average of 9 minutes when cooking a single pan of frozen green peas. Cooking energy efficiency was 52.39% and productivity was 51.51 lb/h.

Red Potato Tests

The red potatoes contained 84% moisture by weight with the specific heat (Cp) of 0.87 Btu/lb° F.[1]. A full load of potatoes averaged 24.667 minutes to reach an average bulk cooked temperature of 195±2° F. The cooking energy efficiency was 55.681% and production capacity was 112.41 lb/h.

The single pan of red potatoes required 21.83 minutes to reach an average bulk temperature of 195±2° F. The light load potato test cooking energy efficiency was 23.11% and production capacity was 22.1 lb/h.

Discussion

The rate at which steam condenses on food depends on the surface temperature and area of the food. Therefore, frozen green peas at 0° F. and red potatoes at room temperature represent two extremes in steam cooking. Frozen green peas, having a large surface area to volume ratio, promote condensation. The energy transfer from steam to frozen peas is high, resulting in greater cooking energy efficiency and productivity. Potatoes are "tough" to cook, due to a low surface area to volume ratio and the slower rate of condensation.

The cooking energy efficiencies were calculated using the equations in Section 11 of the ASTM *Standard Test Methods for Performance of Steam Cookers*, F1484-05. Tables 3 and 4 summarize the steamer's cooking performance.

TABLE 3

Frozen Green Pea Cooking Test Results

| | Heavy Load | Light Load |
|---|---|---|
| Number of Pans | 6 | 1 |
| Cook Time (min) | 22 | 9 |
| Cooking Energy Rate (kW) | 12.2 | 7.6 |
| Cooking Energy Efficiency (%) | 83.14 ± 2.9 | 52.39 ± 4.43 |
| Production Rate (lb/h) | 131.89 ± 0.45 | 51.51 ± 2.5 |
| Energy Consumption (Btu/lb) | 255.66 | 246.32 |

TABLE 4

Red Potato Cooking Test Results

| | Heavy Load | Light Load |
|---|---|---|
| Number of Pans | 6 | 1 |
| Cook Time (min) | 24.667 | 21.83 |
| Cooking Energy Rate (kW) | 7.065 | 3.16 |
| Cooking Energy Efficiency (%) | 56.68 ± 5.61 | 23.11 ± 4.04 |
| Production Rate (lb/h) | 117.41 ± 7.01 | 22.09 ± 0.77 |
| Energy Consumption (Btu/lb) | 205.37 | 488.28 |

FIG. 3 shows the relationship between cooking energy efficiency and production rate for the steamer when cooking two different food products. The upper line represents the appliance's part-load efficiency curve for the steamer when cooking frozen peas and the lower curve represents the part-load efficiency while cooking red potatoes. Steamer production rate is a function of the cook time.

Figure 4:
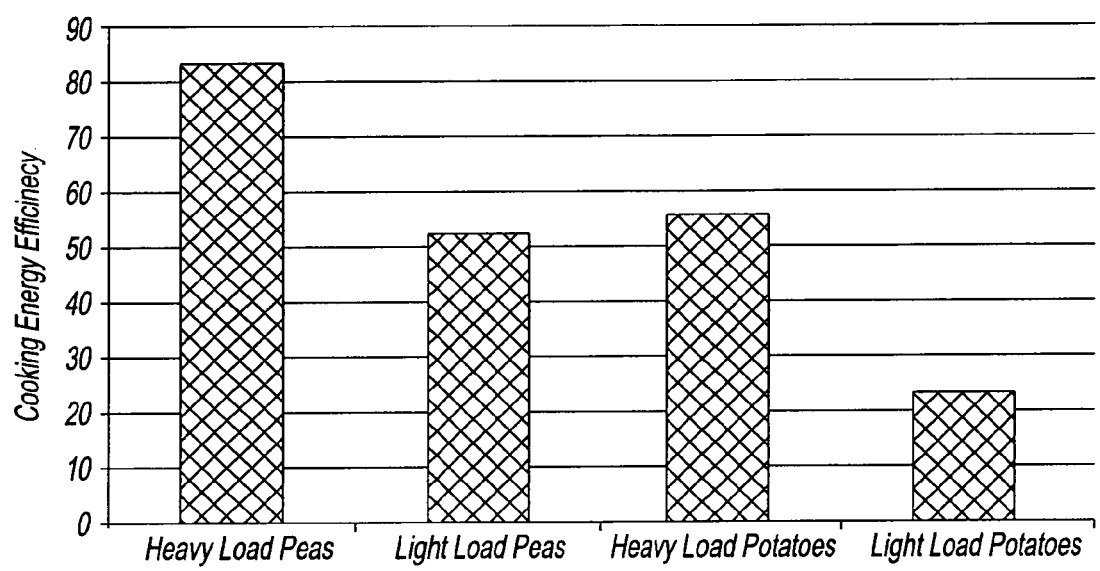
FIG. 4 is a graph plotting cooking energy efficiency for heavy load peas, light load peas, heavy load potatoes, and light load potatoes.

FIG. 4 illustrates the relationship between the steamer's average cooking energy efficiency and the production rate for different types of food product at different test scenarios. Heavy loads tend to exhibit higher efficiencies due to better use of the cooking compartment space, as opposed to light load single pan tests where most of the space in the cooking compartment is empty.

FIG. 4 shows that frozen green peas have higher cooking energy efficiencies than the red potatoes due to their higher surface to volume ratio.

Figure 5:
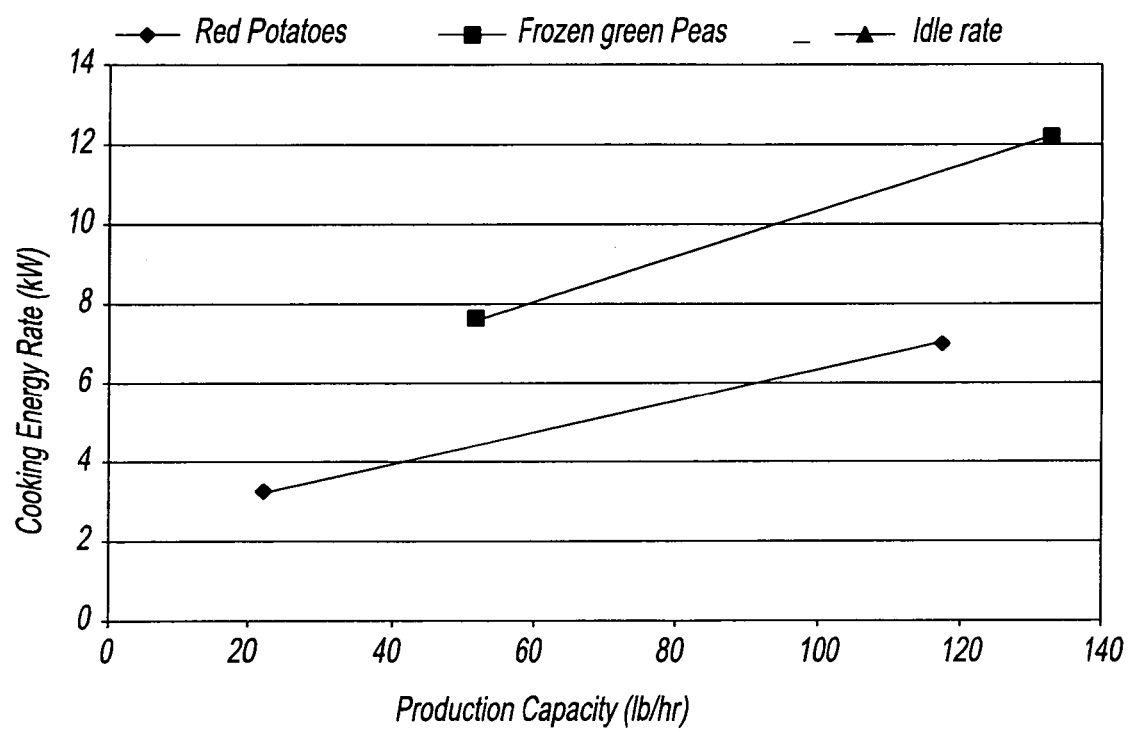
FIG. 5 is a graph plotting cooking energy rate versus production capacity.

FIG. 5 represents the cooking energy rate for two different food products at the two test load scenarios. The upper line represents the appliance's energy consumption rate when cooking frozen green peas while the lower curve represents the appliance's energy consumption rate while cooking red potatoes. All thermostatically controlled electric steamers with the ability to cycle heating elements will exhibit similar cooking rate profiles for frozen vs. fresh food products; these steamers will operate at higher average energy rates for frozen foods than for fresh products. This graph can be used as a tool to estimate the daily energy consumption and probable demand for the steamer in kitchen use, based on the type of usage. Average energy consumption rates at 15, 30, and 60 pounds per hour of frozen peas are 5.4, 6.3, and 8.1 kW, respectively. For an operation cooking an average of 15 pounds of frozen peas per hour the course of the day (150 pounds over a 10 hour day) the probable demand contribution for this steamer would be 5.4 kW.

Ice Load Uniformity Test

Figure 6:
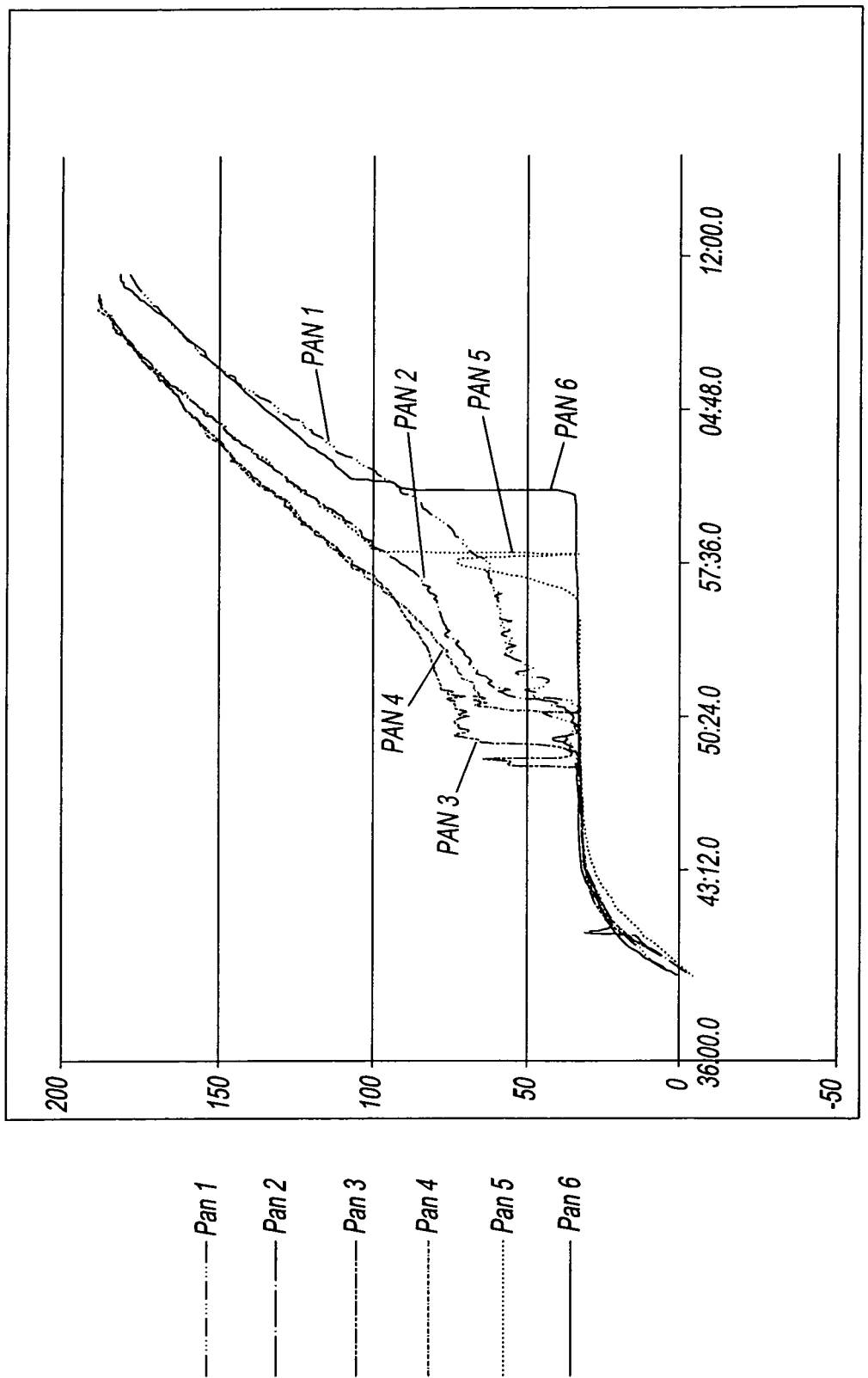
FIG. 6 is a graph depicting ice load temperature profile.

The Ice Load Uniformity Test was designed to emulate frozen vegetables while allowing the accurate monitoring of simulated food temperature during the cooking event. For each test, 6 pans (full load) of ice were used to determine the steaming uniformity within the cooking compartment. The last pan reached 170° F. in 25.97 minutes. At this time, the maximum temperature difference between the hottest and coldest pan was 11.73° F. On average, the last pan to reach the 170° F. endpoint required an additional 1.943 minutes beyond the cook time of the fastest pan. Table 5 summarizes the average results of the Ice Load Uniformity Tests and FIG. 6 show the individual pan temperatures during a single ice load test. Note that the final temperatures are averages of at least three replications and reflect the variations in result from each test.

TABLE 5

Ice Load Uniformity Test Results

| | |
|---|---|
| Number of Pans | 6 |
| Cook Time (min) | 25.97 |
| Initial Ice Load Temperature (° F.) | −4.97 |
| Final Ice Load Temperatures (° F.) | |
| Pan 1 (Top) | 175.23 |
| Pan 2 | 178.04 |
| Pan 3 | 182.61 |
| Pan 4 | 182.09 |
| Pan 5 | 173.09 |
| Pan 6 (Bottom) | 171.12 |
| Maximum Temperature Difference (° F.) | 11.73 |
| Maximum Time Delay* (min) | 1.94 |

*Time required for ice load in last pan to reach 170° F. after first pan reaches the endpoint.

The steamer exhibited excellent cooking performance with production capacities of 131.89 lb/h for frozen green peas and 117.41 lb/h for fresh red potatoes. Further, the steamer had heavy load cooking efficiencies all above 50% and an idle energy input rate of 0.375 kW.

The steamer has 13.5 kW of cooking power and took only 6.6 minutes to reach full cooking temperature. This power was noticeable while cooking heavy loads of frozen green peas in 22 minutes.

As illustrated by the ice load test, cooking uniformity was strong when compared to other 6 pan steamers in the steamer's class. The time between the first and last pans reaching 170° F. was 1.943 minutes.

The steamer used 6 to 10 gallons of water per hour depending on the cooking scenario.

The steamer tested has low energy consumption, high production rates, and is a good candidate for helping reduce operating costs without sacrificing cooking performance for a variety of high volume applications.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

We claim:

1. A steam system comprising:
a cooking chamber;
a housing holding a volume of housing water, said housing having an inlet to receive steam, condensate, drain water, and/or weak steam from said cooking chamber that is directed into said housing water, said housing having an outlet to drain a portion of said housing water from said housing, said housing water being a liquid;
a sensor submerged in said housing water that detects a temperature of said housing water;
a dispenser that sprays cooling water into said housing water to reduce said temperature of said housing water if said temperature exceeds a predetermined upper temperature, said dispenser being connected to said housing above said housing water that is between said inlet and said outlet; and
a vent between said inlet of said housing and said housing water.

2. The steam system of claim 1, further comprising a diverter that spreads said cooling water over said housing water.

3. The steam system of claim 1, further comprising a baffle covering said inlet of said housing that directs said steam, condensate, drain water, and/or weak steam into said housing water, and wherein said dispenser is between said baffle and said outlet.

4. The steam system of claim 3, wherein said vent is disposed between said baffle and said housing that relieves pressure when a predetermined pressure level between said baffle and said housing is exceeded.

5. The steam system of claim 1, further comprising a second vent in said housing that relieves pressure when a predetermined pressure level in said housing is exceeded.

6. The steam system of claim 1, further comprising a port in said housing and an atmospheric vent in said housing that relieves pressure when a predetermined pressure level in said housing is exceeded, wherein said atmospheric vent is flushed through with water that exits said condenser assembly through said port, thereby removing particles out of said housing.

7. The steam system of claim 1, further comprising a steam generator connected to said housing by a steam inlet in said housing, wherein water from said steam generator is drained through said steam inlet, whereby said temperature of said water is reduced by said cooling water before exiting said outlet.

8. The steam system of claim 1, further comprising a conduit connected to said inlet that is connectable to said steam cooking chamber.

9. The steam system of claim 1, wherein said steam system has an energy efficiency of at least 50 percent for electric powered units and at least 38 percent for gas fired units.

10. The steam system of claim 1, wherein said predetermined upper temperature is between about 110 degrees to about 150 degrees Fahrenheit, and wherein said dispenser sprays cooling water into said housing water until said temperature of said housing water is less than between about 90 degrees to about 140 degrees Fahrenheit.

11. A method of draining steam, condensate, drain water, and/or weak steam from a steam system through a condenser assembly having a volume of housing water comprising:
   receiving said steam, condensate, drain water, and/or weak steam from said steam system into said condenser assembly through an inlet in said condenser assembly;
   detecting a water temperature of said housing water in a housing of said condenser assembly;
   activating a dispenser to spray cooling water into said housing water when said temperature of said housing water exceeds a predetermined upper temperature; and
   venting said condenser assembly between said inlet and the housing water.

12. The method of claim 11, further comprising draining a portion of said housing water out of said housing when a water level of said housing water is greater than a predetermined water level.

13. The method of claim 11, wherein said housing has a baffle connected to said inlet in said housing that receives said steam, condensate, drain water and/or weak steam into said housing, and wherein said baffle directs said steam, condensate, drain water, and/or weak steam into said housing water.

14. The method of claim 13, wherein said venting said condenser assembly between said inlet and the housing water comprises venting an area between said baffle and said housing to relieve pressure when a predetermined pressure level between said baffle and said housing is exceeded.

15. The method of claim 11, wherein said condenser assembly is connected to a steam generator, and further comprising draining a portion of water that generates steam from said steam generator through said condenser assembly.

16. The method of claim 11, further comprising reducing a frequency that an energy source of said steam generator to create steam is activated by said activating of said dispenser.

17. The method of claim 11, wherein said predetermined upper temperature is in a range of about 110 degrees to 150 degrees Fahrenheit, and further comprising deactivating said dispenser when said temperature falls below a second predetermined temperature of said housing water that is in a range of less than about 90 degrees to about 140 degrees Fahrenheit.

* * * * *